Patented July 31, 1945

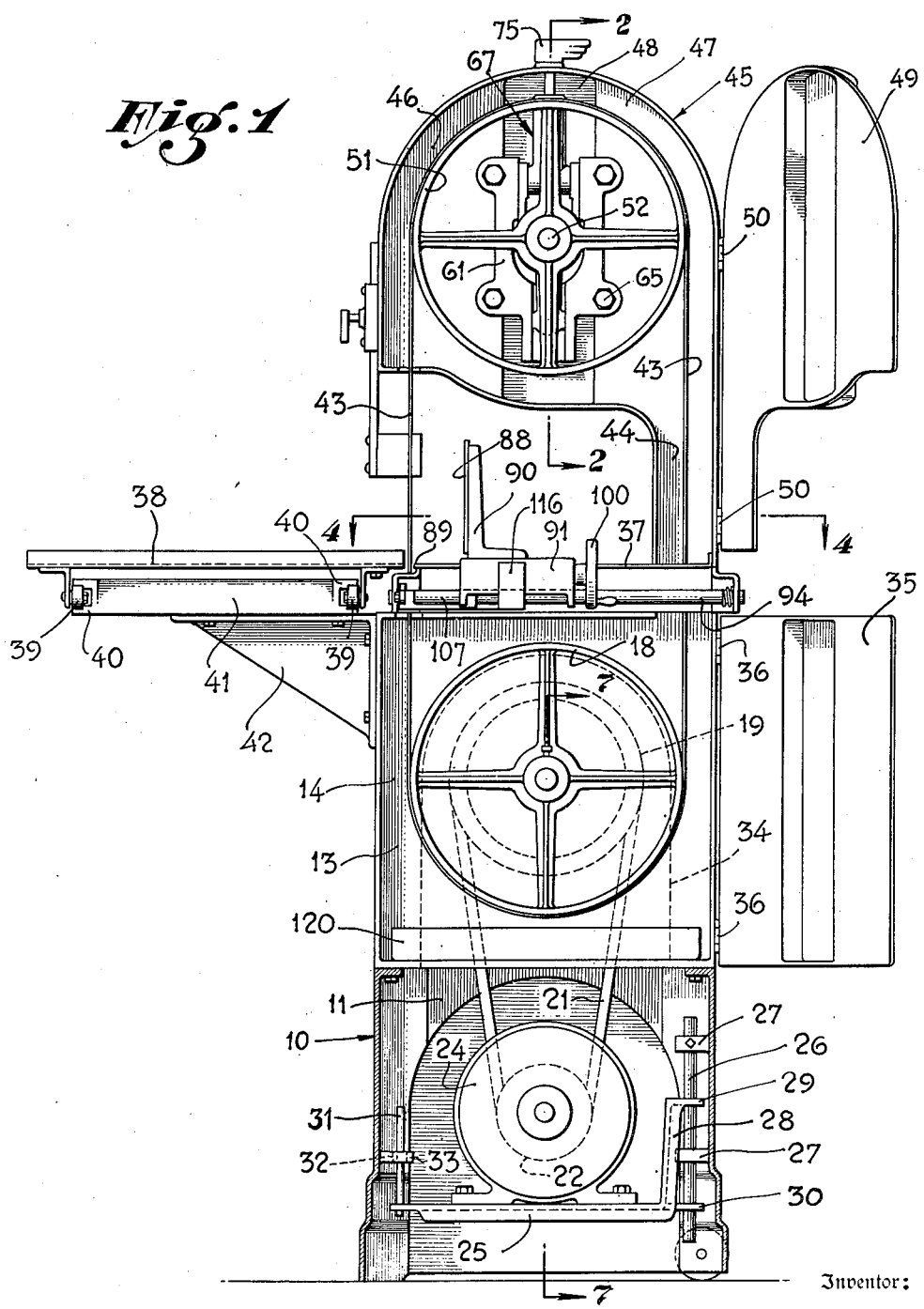

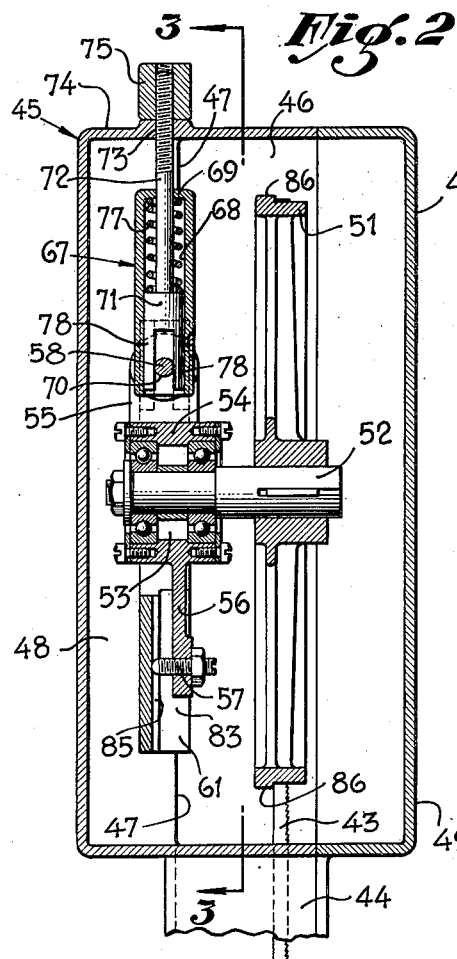

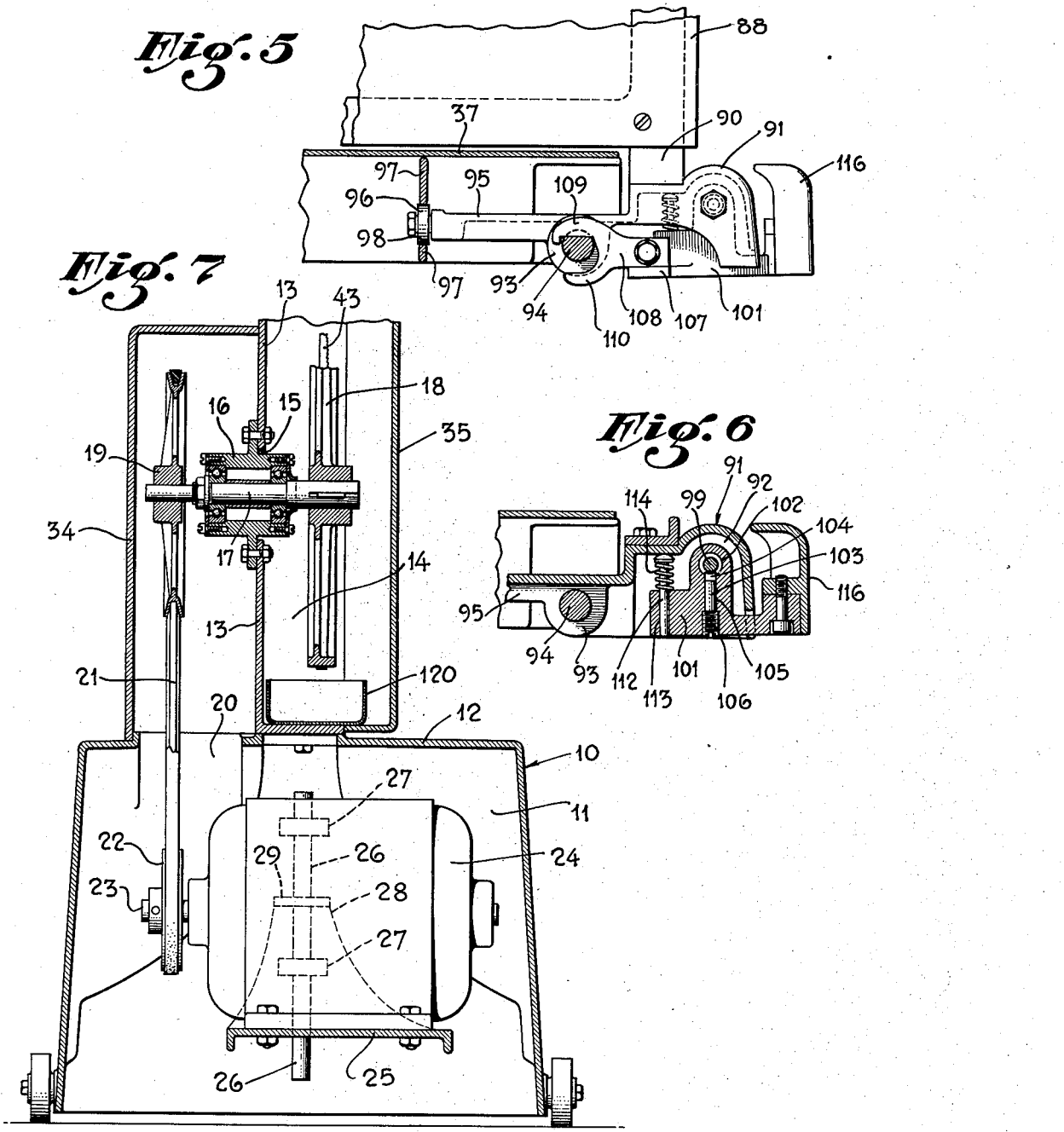

2,380,700

UNITED STATES PATENT OFFICE 2,380,700

MEAT CUTTING MACHINE

William Lasar, Huntington Park, Calif.

Application February 18, 1943, Serial No. 476,264

8 Claims. (Cl. 143—174)

My invention relates to band saws, and relates in particular to a device of this character especially adapted for cutting meat, fish, and bone.

It is an object of the invention to provide a device of this character having a cutting guide which may be readily adjusted for a selected width of cut, but which may be quickly shifted into a retracted position and subsequently returned to its original position without necessity for readjusting. In the preferred embodiment of my invention I provide a guide plate which may be adjusted in spaced relation to the cutter so as to serve as a gauge for cutting steaks, chops, etc., of a predetermined thickness. In the cutting of meat, it is frequently necessary to trim off portions. In order that these trimming operations may be conveniently conducted, my invention provides a release which permits the gauge plate to be shifted to a retracted position, thereby leaving ample room on the table of the cutter for use during the trimming operation. The operator may thereafter shift the gauge plate to the position in which it was originally set without necessity of readjusting the screw which is provided for the purpose of setting the gauge.

It is a further object of the invention to provide a gauge for a cutter of the character described wherein the gauge plate is adjustably mounted on a carriage, which carriage is in turn mounted on a slide disposed along an edge of the table, with lock means for holding the carriage in a predetermined position, but being releasable so that the carriage may be quickly moved along the slide to a retracted position. In this arrangement there is an adjustment screw cooperating between the carriage and the guide plate to adjust the guide plate relatively to the carriage. When it is desired to move the gauge plate from operative to retracted position, the lock between the carriage and the table is released and the whole assembly of carriage and gauge plate are bodily moved along the guide to the far side of the table of the cutter.

A further object of the invention is to provide a simple band tightening means for a cutting saw of the class described which is simple in operation and does not require different parts or complex cam arrangement for belts of different lengths. Although the band saws used for this purpose are designated as being of a predetermined size, the actual size of the band may vary in length so as to be shorter or longer than the size number by which it is designated. My invention provides a band tightening means which accommodates bands of all different sizes and is readily adjustable to apply proper operating tension to the band.

A further object of the invention is to provide a simple band saw meat cutter of especially sanitary character, by reason of the fact that it may be cleaned by use of a stream of hot water or steam throughout all of its parts without danger of injury to the motor by which the device is driven.

A further object of the invention is to provide a simple means for supporting the drive motor of the device in such manner that it will be protected from steam or water applied to the device for the purpose of cleaning the same, so that it will be maintained in proper operating position, and so that the belt will be kept under proper operating tension.

Further objects and advantages of the invention will be brought out in the following part of the specification.

Referring to the drawings which are for illustrative purposes only,

Fig. 1 is a front elevational view of a preferred form of my invention with the upper and lower doors in open position and with the motor housing sectioned so as to show the interior thereof.

Fig. 2 is an enlarged cross section taken as indicated by the line 2—2 of Fig. 1.

Fig. 3 is a fragmentary sectional view taken as indicated by the line 3—3 of Fig. 2.

Fig. 4 is a fragmentary, partly sectioned, elevational view looking downward from the plane indicated by the line 4—4 of Fig. 1.

Fig. 5 is a fragmentary sectional view taken as indicated by the line 5—5 of Fig. 4.

Fig. 6 is an enlarged fragmentary sectional view taken as indicated by the line 6—6 of Fig. 4.

Fig. 7 is an enlarged fragmentary sectional view taken as indicated by the line 7—7 of Fig. 1.

As shown in Figs. 1 and 7, the supporting structure of my device includes at the lower extremity thereof a wheeled base 10 formed so as to provide a hollow motor housing 11. From a point near the center of the upper wall structure 12 of the housing 11, a vertical dividing wall 13 projects upward, this dividing wall 13 forming the back wall of the lower pulley chamber 14 of the device.

As shown in Fig. 7, this wall 13 has an opening 15 in which a bearing 16 is supported so as to carry a shaft 17 which projects through the wall 13 from front to rear thereof. A pulley 18 is fixed on the front end of the shaft 17 within the lower pulley chamber 14 and a drive pulley 19 is fixed on the rear end of the shaft 17. Below this pulley 19 the upper wall structure 12 of the motor housing 11 has an opening 20 for a belt 21 which extends from the pulley 19 to a V-belt sheave 22 which is fixed on the shaft 23 of a motor 24 occupying a space within the housing 11.

This motor 24 is supported so that it may move bodily in vertical direction, and so that it will not rotate either around a vertical axis or a horizontal axis. The supporting means for the motor 24 comprises a base plate 25 to which the motor is bolted, and guide means comprising a vertical guide rod 26 supported in a fixed position within the motor housing 11 by brackets 27. At one side thereof the base plate 25 has an upwardly projecting arm 28 carrying at its upper end a lug 29 which is slidable on the intermediate portion of the guide bar 26 between the brackets 27. Near the lower end of the arm 28 there projects a lower lug 30 which slides on the lower portion of the guide bar 26. The guide means just described prevents rotation of the base plate 25 around non-vertical axes, but permits vertical bodily movement thereof. To prevent rotation of the base plate 25 and the motor 24 around the vertical axis of the guide bar 26, a supplementary guide is furnished comprising a pin 31 projecting vertically from the base plate 25 and engaging a slot 32 in a stationary lug 33 within the housing 11. The weight of the motor 24 is carried by the belt 21, which is of such size and strength that it will capably support the weight of the motor while at the same time the weight of the motor will hold the belt under such tension that whipping of the belt is entirely eliminated. In the size of cutting device shown in the drawings, the motor 24 has a capacity of 1 horse power. With this motor I employ a belt 21 designed to transmit 2 horse power at the existing speed of operation, thereby providing in the belt sufficient strength to transmit the required horse power and to support the weight of the motor. In the arrangement shown, no adjusting of motor and belt is required. This adjustment is automatic, for, as the belt stretches, the motor moves downward along the path defined by its guide means.

A cover 34 is provided for the pulley 19 and the upper portion of the belt 21. This cover 34 is of such size that it also covers the opening 20 in the upper wall structure 12 of the motor housing. The pulley chamber 14 has a cover 35 hinged at 36 so that it may be swung between open and closed positions. At the upper end of the wall 13 there is a horizontal table 37 which remains stationary, and at the left side of the table 37, as shown in Fig. 1, there is a movable table 38 supported by rollers 39 moving in horizontal tracks 40 carried at the edges of a plate 41 supported by a bracket 42 which is connected to the supporting structure of the device substantially in alignment with the wall 13. The movable table 38, accordingly, may be moved back and forth along the edge of the table 37 and on it may be supported the piece of meat which is to be cut into slices by a band saw 43.

A hollow column 44 projects upward from the rightward side of the table 37, to support the head 45 of the device, this head 45 being pan-shaped so as to provide an upper pulley chamber 46. The pulley chamber 46 has a back wall 47 with a vertical depression or channel 48. A cover 49, corresponding in shape to the profile of the head 45 and the hollow column 44, is hinged at 50 so that it may be swung from opened to closed position. In the upper pulley chamber 46 there is a pulley 51 corresponding in size to the pulley 18, over which the upper portion of the band saw 43 runs. As best shown in Fig. 2, the pulley 51 is supported for rotation and for adjustment so that it may be rocked on a horizontal axis, for purpose of aligning it with the lower pulley, and so that it may be bodily shifted vertically, under suitable tension, so as to apply operating tension to the saw 43. The pulley 51 is fixed on a shaft 52 rotatably carried by bearing means 53 in a yoke 54 which comprises a pair of spaced upwardly extending arms 55 and a downwardly extending arm or finger 56 which carries a round point adjusting screw 57 at its lower extremity. The yoke 54 is hung from a horizontal pin 58 which projects through the upper portions of the arms 55 of the yoke 54, with the ends 59 of the pin projecting into vertical guide channels 60 formed in a supporting plate or bracket 61. This supporting plate 61 has a lower transverse portion 62 and upwardly projecting legs 63 which extend into the vertical depression or channel 48 formed in the back wall 47 of the upper pulley chamber 46. The supporting plate 61 has laterally projecting flanges 64 which extend over the portions of the wall 47 adjacent the vertical edges of the channel 48, and cap screws 65 pass through the flanges 64 into threaded engagement with the wall 47, to secure the supporting plate 61 in vertical alignment with the lower pulley shaft 17, as shown in Fig. 1. The guide channels 60 for the ends 59 of the pin 58 are formed in the inner faces of the upper portion of the legs 63.

The intermediate portion of the pin 58, between the arms 55 of the yoke 54 is surrounded by a hanger member 67 which is of hollow construction and has a bore 68 which extends upward from its lower end and is closed by a wall 69 at its upper end. As shown in Figs. 2 and 3, the lower part of the hanger member 67 has lateral openings 70, through which the intermediate portion of the pin 58 extends.

A cylindric body 71 is slidably disposed in the bore 68 of the hanger member 67. A tension rod 72 extends from the body 71 upward through the upper wall 69 of the hanger and through an opening 73 in the upper wall 74 of the pulley housing 46. The upper portion of the tension rod 72 is threaded so as to receive a nut 75 having a projecting handle 76 for manually rotating it. Between the upper face of the body 71, as shown in Fig. 2, and the wall 69, there is a spring 77 which supports the load of the hanger 67 and the parts suspended therefrom, namely, the yoke 54, the bearing means 53, the shaft 52, the pulley 51 and the tension of the saw 43. The body 71 is forked or slotted so as to provide legs 78 which straddle the central portion of the pin, thereby preventing rotation of the body 71 and the screw 72 when the nut 75 is rotated for the purpose of adjusting the tension of the belt 43.

The deflection of the spring 77 is a measure of the load applied to the hanger 67; therefore, the relative upward movement of the head 71 in the bore 68 is an indication of the load carried by the spring 77 and also an accurate indication of the tension applied to the belt 43. To indicate when the tension rod 72 has been lifted a sufficient distance in response to rotation of the nut 75 to apply proper tension to the saw 43, I provide cooperative indicating marks on the body 71 and on the hanger member 67. The hanger member 67 is provided with an opening 80 through which a portion of the body 71 is visible. At the sides of the opening 80 there are indicators 81 and on the front face of the body 71 there are indicator markings 82 which may be observed through the opening. The simple procedure for applying proper tension to the saw 43 is as follows. Assuming that the saw 43 is in place around the pulley 51 and also around the lower pulley 18, the operator merely rotates the adjusting nut 75 to move the tension rod 72 upward. As soon as the saw 43 is stretched taut, compression of the spring 77 will start, and as tension is then applied to the saw 43, the head 71 will start to move upward within the hanger member 67, and the indicator markings 82 will move upward relatively to the indications 81, to indicate to the operator the degree of tension applied to the saw 43. This procedure is the same regardless of whether the saw 43 is under size or over size. No filler pieces or cam adjustments are required, but the entire adjusting operation consists merely of rotation of the nut 75.

The transverse wall 62 of the supporting plate 61 has a vertical channel 83 serving as a guide to limit lateral movement of a head 84 formed on the lower end of the finger 56 of the yoke 54. Accordingly, the yoke cannot tilt laterally, but its lower end or finger portion 56 may be swung in and out or forwardly and rearwardly. Adjusting rotation of the yoke 54, and likewise of the shaft 52 and the pulley 51, around the axis of the pin 58 is accomplished by varying the rearward extension of the screw 57, the inner end of which rides in a vertical shallow channel 85 in the transverse section 62 of the member 61. By this adjustment the pulley is rocked on a lateral horizontal axis to such position that the saw 43 will track in the center of the pulley flange and approximate to the shoulder 86 thereof.

A gauge plate 88 is supported in parallelism to the leftward edge 89 of the stationary table 37. This gauge plate 88 is secured by means of a bracket 90 to a hollow body 91 which is inverted so that its internal opening or cavity 92 faces downward as shown in Fig. 6. This hollow body 91 has a pair of spaced bosses 93 bored so as to receive a guide bar 94. The hollow body 91 has an arm 95 which projects under the table 37 as shown in Figs. 4 and 5, and at its far end supports a roller 96 which travels along a track 97 disposed under the table 37 parallel to the bar 94. This track 97 comprises a pair of horizontal bars defining a slot 98 which receives the roller 96. The bar 94 and the track 97 comprise guide means for holding the body 91 and the gauge plate 88 in fixed relation to the upper surface of the table 37.

In parallel relation to the bar 94, the hollow body 91 carries an adjusting screw 99 having on one end thereof a hand wheel 100 whereby it may be rotated. On this screw 99 there is a body 101 having an opening 102 through which the screw 99 passes, and having in perpendicular relation to the screw 99 a pin 103 with a flattened end 104 to engage the thread of the screw 99, this pin 103 being held in a hole 105 in the body 101 by a set screw 106, as shown in Fig. 6. The body 101 has a leftwardly projecting portion or arm 107 carrying at its leftward end a lock plate 108 which projects toward the bar 94 and has upper and lower fingers 109 and 110 projecting respectively above and below the bar 94 as best shown in Fig. 5. The bar 94 has near its leftward end a notch 111 which receives the upper finger 109 of the lock plate 108 when the arm 107 and its supporting body 101 are in the positions thereof shown in Figs. 4 and 5. The body 101 is rotated in counterclockwise direction by means of a pin 112 slidable in a vertical hole 113 in the body 101, the head of this pin 112 being held in engagement with the lower surface of the upper wall of the body 91 by a spring 114 which is maintained under compression so that its reaction will tend to rotate the body 101 to yieldably force the finger 109 of the lock plate 108 downward, whereby it will enter and be retained in the notch 111 whenever in alignment therewith. A handle 116, disposed in front of the body 91, is connected to the body 101, and by downward manual pressure against this handle 116, the body 101 may be rotated in clockwise direction, Fig. 5, so as to lift the finger 109 from the notch 111 whereupon the body 101, which may be referred to as a carriage, and the body 91, which is adjustably associated therewith through the screw 99, may be shifted rightward from the position in which these parts are shown in Fig. 4 to a position at the right side of the table 37 wherein the gauge plate 88 will lie close to the column 44, thereby leaving the major portion of the upper surface of the table 37 unobstructed so that a piece of meat to be cut or trimmed may be freely moved through different positions on the surface of the table 37.

In the use of the device an operator may, by use of the gauge plate 88, cut several slices from a piece of meat. He may then find it necessary to trim portions from the piece of meat. At this time he may press downward and rightward on the handle 116 and by so doing will release the lock 108 from the notch 111 and slide the members 101, 91, and 88 rightward to retracted positions. It will be recognized that this involves no change in the position of the screw 99 or the position of the body 101 relative to the body 91. Therefore, after the trimming operation, the operator may quickly return the gauge plate 88 to the position in which it was originally set, merely by pulling the body 91 leftward until the lock plate 108 is brought into conjunction with the notch 111, which is defined by shoulders which limit movement of the lock plate 108 in a direction corresponding to the direction of the bar 94. If the operator desires to change the setting of the gauge plate 88, he merely rotates the screw 99 so as to cause this screw to move axially with relation to the body 101 and to thereby shift the body 91 and the gauge plate relatively to the body 101 and the edge 89 of the table 37.

As shown in Figs. 1 and 7, a pan 120 is disposed in the bottom of the lower pulley chamber 13 to receive cuttings which are carried into this chamber by the saw 43. When it is desired to clean the device, which should be done at least once a day, the doors 35 and 49 are opened and hot water or steam is directed into these upper and lower chambers 45 and 13, and also the interior of the column 44 to thoroughly remove therefrom all deposited particles. The motor 24 and the belt drive, including the upper pulley 19, are completely guarded from the water or steam due to the specific arrangement of parts hereinbefore described.

I claim as my invention:

1. In a gauge for a cutting device having a table and a cutter, the combination of: a guide establishing a transverse path of movement crosswise of said table, said guide having a notch therein; a hollow body movable on said guide along said path of movement from a front position to a retracted position, said body having a downwardly faced opening and there being a cutting gauge thereon; a screw in said body positioned so as to pass across said opening; means externally of said body to rotate said screw; a member moved in a direction corresponding to said path and through different positions of adjustment in said body by said screw, said member being rockable on said screw; an engager on said member for engaging said notch in said guide when said hollow body is in said front position; and a handle element on said member projecting externally from said hollow body and being positioned so that downward and rearward pressure applied to said handle element will rock said member and disengage said engager from said notch and move said body and cutting gauge to retracted position on said table.

2. In a gauge for a cutting device having a table and a cutter, the combination of: a guide establishing a transverse path of movement crosswise of said table; a hollow body movable on said guide along said path of movement from a front position to a retracted position, said body having a downwardly faced opening and there being a cutting gauge thereon; a screw in said body positioned so as to pass across said opening; means externally of said body to rotate said screw; a member moved in a direction corresponding to said path and through different positions of adjustment in said body by said screw, said member being rockable on said screw; lock means to hold said member in a position contiguous to the front end of said path of movement, said lock means being connected to said member so as to be released in response to rocking movement thereof; and a handle element on said member projecting externally from said hollow body and being positioned so that downward and rearward pressure applied to said handle element will rock said member and disengage said lock means and move said body and cutting gauge to retracted position on said table.

3. In a gauge for a cutting device having a table and a cutter, the combination of: a guide establishing a transverse path of movement crosswise of said table; a hollow body movable on said guide along said path of movement from a front position to a retracted position, said body having a downwardly faced opening and there being a cutting gauge theeron; a screw in said body positioned so as to pass across said opening; means externally of said body to rotate said screw; a member moved in a direction corresponding to said path and through different positions of adjustment in said body by said screw; lock means to hold said member in a position contiguous to the front end of said path of movement; and means for simultaneously releasing said lock means and moving said body into retracted position, comprising a handle element on said body and a connection with said lock means whereby downward and rearward pressure applied to said handle element will release said lock means and move said body and cutting gauge to retracted position relative to said table.

4. In a gauge assembly for a cutting device having a cutter and a table for supporting material while it is being cut by the cutter, the combination of: a gauge supporting body, means mounting said body for sliding movement toward and away from said cutter between a predetermined fixed working position and a retracted position, means for latching said body in said working position, a gauge, means mounting said gauge on said body for adjustable movement relative to said body toward and away from the cutter, whereby release of said latch means allows said gauge to be moved to retracted position without changing the adjusted position of said gauge relative to said body.

5. In a gauge for a cutting device having a table and a cutter, the combination of: a cutting gauge movable from working position to retracted position relative to said cutter; releasable lock means to hold said gauge in said working position, said lock means comprising a notch in stationary relation to said table when said gauge is stationary in its working position relative to said table and an engager which is stationary to said gauge when it is in its working position; a separate adjusting means for moving said gauge toward and away from said cutter while said gauge is in said working position; and means to release said lock means whereby said gauge may be moved from working position to retracted position without changing the adjustment of said adjusting means and may be returned to working position by bringing said engager and said notch into engagement.

6. In a gauge for a cutting device having a table member and a cutter, the combination of: a cutting gauge member movable from working position to retracted position relative to said cutter; guide means for holding said gauge in operative relation to the surface of said table as it is moved from working position to retracted position; releasable lock means comprising a lock part connected to said table member and a lock part connected to said gauge member to hold said gauge in said working position; a separate adjusting means for producing relative movement of one of said lock parts and the member to which it is connected so as to adjust said gauge toward and away from said cutter when said gauge is in said working position; and means to release said lock means whereby said gauge may be moved from working position to retracted position without changing the adjustment of said adjusting means.

7. In a gauge for a cutting device having a table and a cutter, the combination of: a cutting gauge movable from working position to retracted position relative to said cutter; guide means for holding said gauge in spaced relation to the surface of said table as it is moved from working position to retracted position; releasable lock means to hold said gauge in said working position, said lock means comprising a notch in stationary relation to said table when said gauge is stationary in its working position relative to said table and an engager which is stationary to said gauge when it is in its working position; a separate adjusting means for moving said gauge toward and away from said cutter while said gauge is in said working position; and means to release said lock means whereby said gauge may be moved from working position to retracted position without changing the adjustment of said adjusting means.

8. In a gauge for a cutting device having a table and a cutter, the combination of: means forming a track on the under side of said table parallel to the edge thereof transverse to said cutter; a guide bar establishing a transverse path of movement crosswise of said table at the front end thereof; a hollow body movable on said guide along said path of movement from a front position to a retracted position, said body having a downwardly faced opening and there being a cutting gauge thereon; an arm extending from said hollow body under said table and having a roller at the end thereof to engage said track to prevent rocking of said body and said cutting gauge; a screw in said body positioned so as to pass across said opening; means externally of said body to rotate said screw; a member moved in a direction corresponding to said path and through different positions of adjustment in said body by said screw, said member being rockable on said screw; an engager on said member for engaging said notch in said guide when said hollow body is in said front position; and a handle element on said member projecting externally from said hollow body and being positioned so that downward and rearward pressure applied to said handle element will rock said member and disengage said engager from said notch and move said body and cutting gauge to retracted position on said table.

WILLIAM LASAR.